US012212885B1

(12) United States Patent
Drummond et al.

(10) Patent No.: US 12,212,885 B1
(45) Date of Patent: Jan. 28, 2025

(54) MEMORIES AND MOMENTS IN AUGMENTED REALITY (AR)

(71) Applicant: Snap Inc., Santa Monica, CA (US)

(72) Inventors: Virginia Drummond, Venice, CA (US); Celia Nicole Mourkogiannis, Los Angeles, CA (US); Ibrahem Shekoni, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 333 days.

(21) Appl. No.: 17/565,275

(22) Filed: Dec. 29, 2021

Related U.S. Application Data

(60) Provisional application No. 63/132,900, filed on Dec. 31, 2020.

(51) Int. Cl.
*H04N 5/272* (2006.01)
*G06F 3/04817* (2022.01)
*G06F 3/04842* (2022.01)
*H04N 1/00* (2006.01)
*H04N 5/262* (2006.01)
*H04N 23/63* (2023.01)
*H04N 101/00* (2006.01)

(52) U.S. Cl.
CPC ......... *H04N 5/272* (2013.01); *G06F 3/04817* (2013.01); *G06F 3/04842* (2013.01); *H04N 1/00156* (2013.01); *H04N 1/00506* (2013.01); *H04N 1/00514* (2013.01); *H04N 5/2621* (2013.01); *H04N 23/631* (2023.01); *H04N 2005/2726* (2013.01); *H04N 2101/00* (2013.01)

(58) Field of Classification Search
CPC ........... H04N 1/00156; H04N 1/00506; H04N 1/00514; H04N 2005/2726; H04N 2101/00; H04N 23/631; H04N 5/272; H04N 5/2621; G06F 3/04817; G06F 3/04842
See application file for complete search history.

(56) References Cited

U.S. PATENT DOCUMENTS

| | | | |
|---|---|---|---|
| 9,100,588 B1 * | 8/2015 | Seymour | H04N 5/2723 |
| 10,348,970 B2 * | 7/2019 | Kang | H04N 23/698 |
| 10,623,666 B2 * | 4/2020 | Charlton | H04N 23/62 |
| 10,645,294 B1 * | 5/2020 | Manzari | H04N 23/74 |

(Continued)

*Primary Examiner* — Twyler L Haskins
*Assistant Examiner* — John H Morehead, III
(74) *Attorney, Agent, or Firm* — Schwegman Lundberg & Woessner, P.A.

(57) ABSTRACT

In one aspect, the method includes causing presentation of a camera interface, the camera interface to display a first image captured by a camera of a computing device of a first user, causing presentation of a plurality of augmentation icons within the camera interface, each of the image augmentation icons being associated with a respective image augmentation mechanism, detecting user selection of an auxiliary augmentation icon of the plurality of image augmentation icons, the second image icon being associated with an second image augmentation mechanism, determining an second image selection criterion for an second image augmentation mechanism, selecting an second image based on the second image selection criterion, the second image being selected from a plurality of photographs associated with the first user, and overlaying the second image on the first image to generate a composite image that is presented within the camera interface.

33 Claims, 11 Drawing Sheets

(56) References Cited

U.S. PATENT DOCUMENTS

| | | | |
|---|---|---|---|
| 10,701,286 B2* | 6/2020 | Sasaki | G06T 3/12 |
| 2013/0278631 A1* | 10/2013 | Border | G06F 3/04842 |
| | | | 345/633 |
| 2018/0082117 A1* | 3/2018 | Sharma | G06T 19/003 |
| 2021/0352029 A1* | 11/2021 | Lo | H04L 51/52 |

* cited by examiner ously used on the sender device is used to access the digital image from the local media library. Detection of the relevant augmentation icon is performed on the receiver device, and matching of the data structure.

MEMORIES AND MOMENTS IN AUGMENTED REALITY (AR)

CROSS-REFERENCE TO RELATED APPLICATION

This patent application claims the benefit of U.S. Provisional Patent Application No. 63/132,900, filed Dec. 31, 2020, entitled "MEMORIES AND MOMENTS IN AUGMENTED REALITY (AR)", which is incorporated by reference herein in its entirety.

BACKGROUND

With the explosion of digital photography, individuals are creating increasingly large collections of digital photographs and are sharing the digital photographs frequently and broadly with other persons to who they are connected through friendship and family relationships. However, as the number of digital photographs available to any individual continues to grow, it has become increasingly difficult for individuals conveniently to manage, locate and share photographs that may be of interest to both the individual, as the sender, and other individuals or a group of individuals, as the receivers.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

An example interaction system is described that enables the initiation and sharing of augmented reality (AR) experiences, based on stored digital images (e.g., still images or video) between users of the interaction system. The described example augmented reality (AR) technology enables users to share digital content reflecting memories, moments, and other shared experiences using a convenient mechanism that provides an improved person-machine interface. Further, the described example technology deploys automation to automatically detect and present digital content for sharing between users, based on several criteria.

Figure 1:
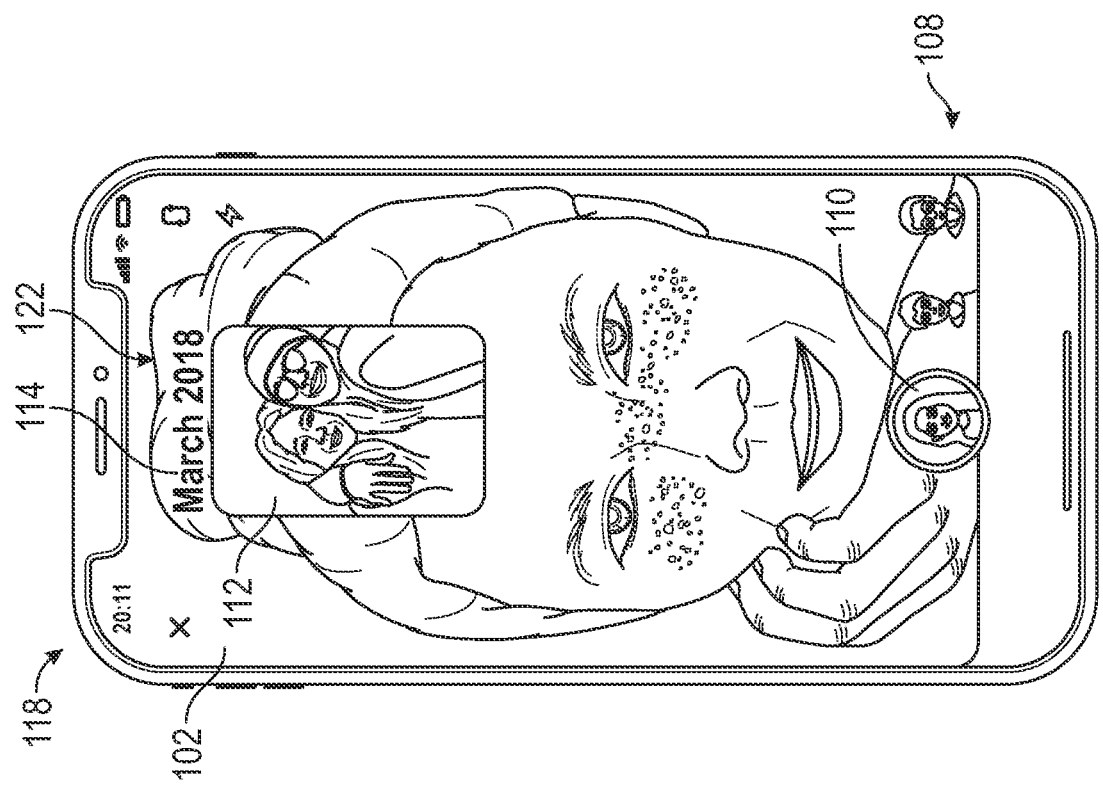
FIG. 1 illustrates an aspect of the subject matter in accordance with some examples.
Figure 1:
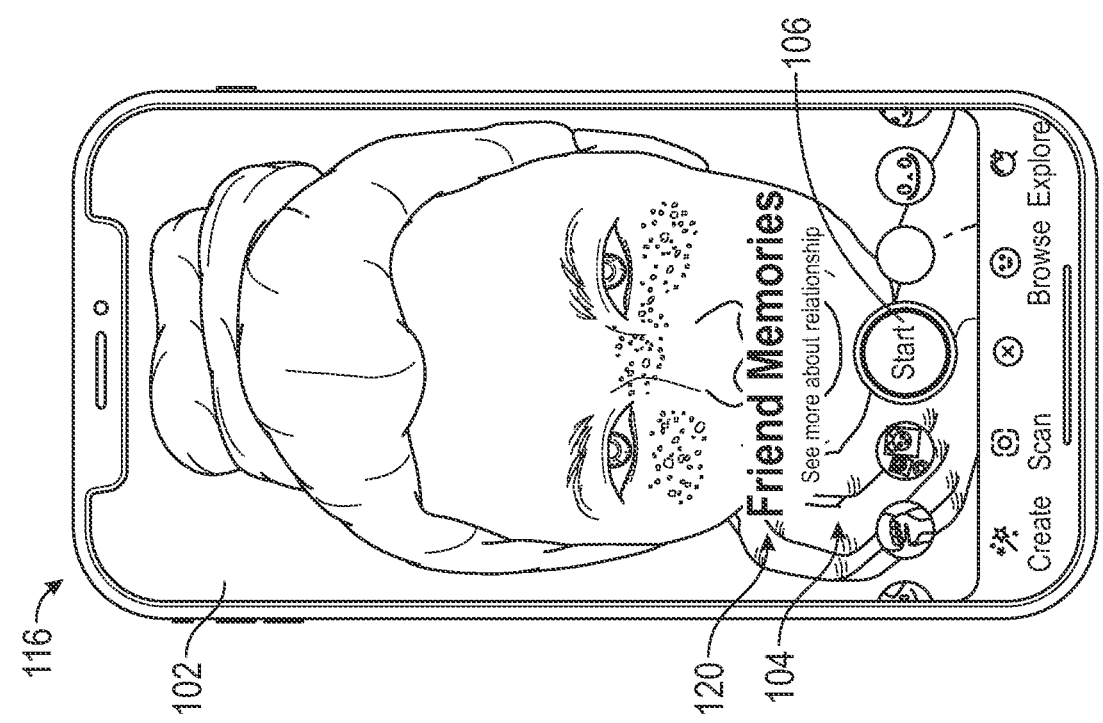

FIG. 1 is a user interface diagram showing screenshot 116 and screenshot 118 of an example camera interface 102 that may be presented on a client device 302 (e.g., a mobile phone or other client device) by an interaction client 304 (e.g., a communications or social networking app) executing on the client device 302. The camera interface 102 operationally displays digital content (e.g., still image or video data) in the example form of a primary image 114, as captured by a camera that forms part of or that is coupled to the client device 302. For example, where the client device 302 is a mobile phone, the image data displayed within the camera interface 102 may be real-time video images captured by a front-facing camera of the mobile phone and streamed to a display of the mobile phone display by the interaction client 304 within the context of the camera interface 102.

The camera interface 102 also displays a rotatable filter carousel 104 of filter icons 106, the filter icons 106 being examples of augmentation icons that are presented within the camera interface 102 for user selection. Each of the filter icons 106 is associated with a respective image augmentation mechanism (e.g., an image filter) that is invoked by a user selection (e.g., by tapping on the screen of the client device 302) of the associated filter icon 106. In one example, only the filter icon 106 displayed the horizontally center position of the carousel is selectable to invoke the associated image augmentation mechanism. A user rotates the filter carousel 104 by performing a swipe operation, applied to the screen of the client device 302 in either the left or the right direction, so as to rotate the filter carousel 104 accordingly. A user is also able to rotate the filter carousel 104 by selecting an off-center filter icon 106, which will rotate the filter carousel 104 so as to place the selected folder icon in the horizontally centered position, at which the user can type on the centered filter icon 106 to activate the relevant image augmentation mechanism.

A filter icon 106 displayed at a position at or adjacent to the horizontal center of the camera interface 102 is furthermore enlarged relative to other filter icons 106 to indicate that it is selectable to activate the associated image augmentation mechanism. Further, a title or other descriptive information 120 associated with the centered filter icon 106 may be displayed above the filter icon 106. In the displayed example screenshot 116, the title "friend memories" is displayed above the centered filter icon 106 as an example of such descriptive information 120.

Considering the example of a "friend memories" filter icon 106, user selection of this filter icon 106 within the camera interface 102 causes activation of an associated "friend memories" filter, as an example of an associated auxiliary image augmentation mechanism. Each auxiliary image augmentation mechanism has an associated auxiliary image selection criterion that is activated responsive to the user selection of the associated filter icon 106. For example, the "friend memories" filter, once activated, causes modification of the camera interface 102 to show a further friend carousel 108, an example of which is shown in the screenshot 118. The friend carousel 108 is navigable in the same way as the filter carousel 104.

The friend carousel 108 is populated with user graphical elements in the form of friend icons 110. Each friend icon 110 represents a respective user of an interaction system that is connected or linked to a viewing user (e.g., is a "friend" of the viewing user) and includes a digital, two-dimensional avatar of the relevant user. Responsive to user selection of friend icon 110 within the friend carousel 108, a user identifier for the selected user associated with the selected friend icon 110 is retrieved. This user identifier is then used to identify digital content, such as an auxiliary image 112, related to the selected user. This auxiliary image 112 is selected from a collection of digital content (e.g., photographs) that are associated with the viewing user of an application (e.g., interaction client 304). The collection of digital content is managed by a collection management system 416.

The selected auxiliary image 112 is displayed within the camera interface 102, as shown in screenshot 118. The selected auxiliary image 112 is, in some examples, overlaid on a primary image 114 in order to create a composite data (e.g., comprising the primary image 114 and the auxiliary image 112) that is presented in displayed within the camera interface 102. The selected auxiliary image 112 may also be displayed with relevant metadata 122, such as date information reflecting a date on which the auxiliary image 112 was captured.

In this way, an image augmentation mechanism is presented to a user that automatically identifies other users of an interaction system 300 to which a viewing user is connected (e.g., friends of the viewing user) and automatically surfaces augmentation data (e.g., one or more auxiliary images 112) that can be conveniently shared and used to create a new composite image or collage. The new composite image may, for example, be captured by and stored on a client device 302, and furthermore included in a message that is shared with other users.

In a further example, video content is displayed within the camera interface 102 during a synchronous video chat, and an example image augmentation mechanism may be used to surface and share augmentation data (e.g., an auxiliary still or video images) with other participants of a video chat. In this example, as opposed to displaying a still auxiliary image 112, video auxiliary images 112 may be selected, and presented as an overlay on video primary images 114 within the camera interface 102.

Figure 2:
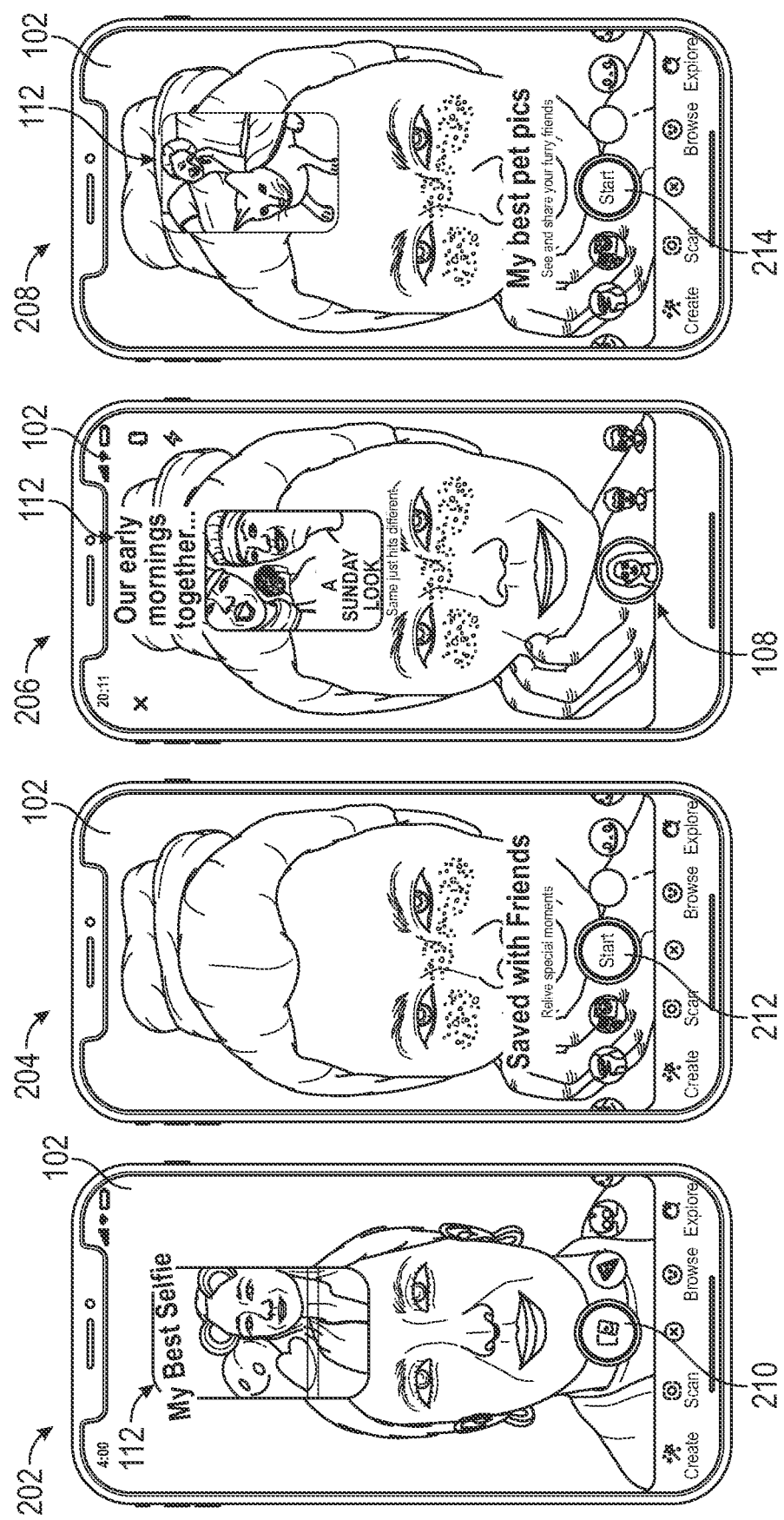
FIG. 2 illustrates an aspect of the subject matter in accordance with some examples.

FIG. 2 is a user interface diagram showing screenshots of further examples of image augmentation mechanisms, in the form of filters, that can be invoked to cause selection and presentation of an auxiliary image with a primary image within a camera interface 102.

In screenshot 202, a filter icon 210 is user selectable to invoke a "my best selfie" filter, which operatively determines an auxiliary image selection criterion related to high-quality or favorite "selfie" images of a viewing user (e.g., depicted in the primary image 114). High-quality images meeting this criterion may be automatically selected, from a collection of digital images associated with the viewing user, in an automated manner based on predetermined image characteristics. Alternatively, certain images may have been flagged or tagged by the viewing user as favorite images. Further, the content of digital images within the collection may be automatically analyzed to identify, and flag images are "selfie" images. Once the "my best selfie" filter mechanism has identified one or more digital images that satisfy the relevant criterion, these images are presented as auxiliary images 112 within the camera interface 102. Where multiple digital images are identified as satisfying the selection criterion, multiple such images may be simultaneously presented within the camera interface 102 as a collage. Alternatively, the camera interface 102 may enable the viewing user to "scroll" through these multiple images by tapping on a displayed auxiliary image 112 to advanced display to a next image in the selected group of auxiliary images.

Screenshot 204 shows an example "saved with friends" filter, having an associated filter icon 212 that is user-selectable to invoke a filter mechanism that automatically identifies one or more digital images that include both the viewing user and one or more "friends" of the viewing user. Friends of the viewing user are determined by the user management system 412, with reference to the entity table 506, entity graph 508, and profile data 516 stored within the database 518.

Screenshot 206 illustrates an example "time of day" filter having an associated icon that is user-selectable to invoke a friend carousel 108, including avatar icons for friends of the viewing user. User selection of one of the avatar icons results in the creation of composite selection criteria, including a time of day criterion (e.g., early mornings) and a friend criterion (e.g., based on a user identifier of the friend associated with the selected avatar icon). The composite selection criteria is used to identify an auxiliary image 112 that includes a depiction of the selected friend, and for which the metadata indicates that the auxiliary image onto was taken before 8 AM. The auxiliary image 112 is then shown overlaid on a primary image 114 to create a composite image.

Screenshot 208 illustrates an example "pet" filter having an associated pet filter icon 214 that is user-selectable to invoke a filter mechanism that automatically identifies one or more digital images showing an animal or pet of the viewing user. Image recognition technology may be used, in some examples, to detect digital photographs shared by the viewing user that include an animal. In other examples, metadata associated with digital photographs (e.g., the content of text messages within which a digital photograph was included) may be used to identify digital photographs shared by the viewing user, and that depict a pet.

It will be appreciated that a wide variety of selection criteria may be used to identify digital photographs, associated with the viewing user, there may be a selected as an auxiliary image 112, and used to create a collage or composite image that includes the auxiliary image 112 (or multiple auxiliary images 112) and a primary image 114.

An example interaction system 300, within which example image augmentation mechanisms may be deployed, will now be described, whereafter further details will be provided regarding various orientation mechanisms will be provided.

Networked Computing Environment

Figure 3:
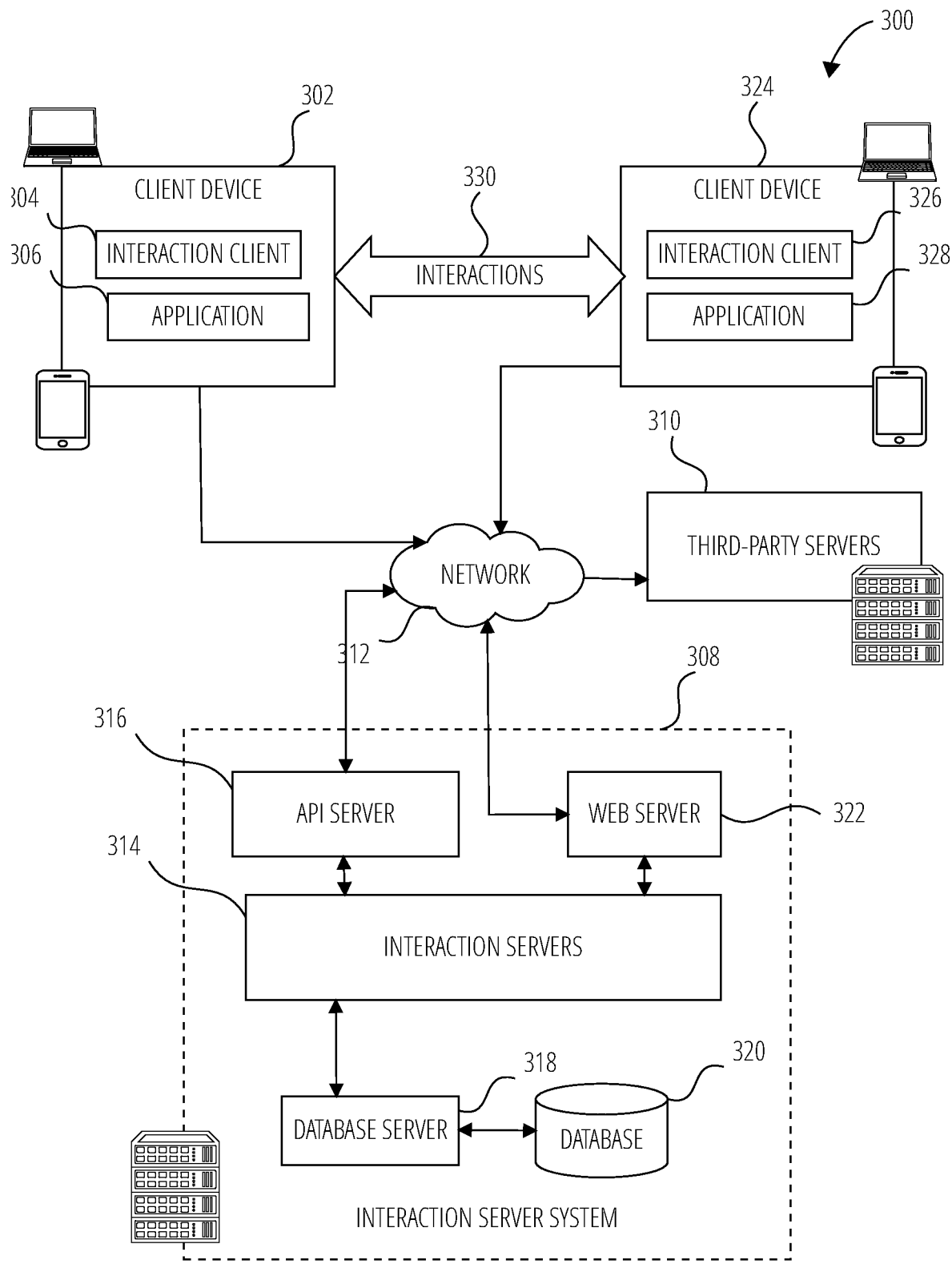
FIG. 3 is a diagrammatic representation of a networked environment in which the present disclosure may be deployed, in accordance with some examples.

FIG. 3 is a block diagram showing an example interaction system 300 for facilitating interactions (e.g., exchanging text messages, conducting text audio and video calls, or playing games) over a network. The interaction system 300 includes multiple instances of a client device 302, each of which hosts a number of applications, including an interaction client 304 and other applications 306. Each interaction client 304 is communicatively coupled, via a network 312 (e.g., the Internet), to other instances of the interaction client 304 (e.g., hosted on respective other client devices 302), an interaction server system 308 and third-party servers 310).

An interaction client 304 can also communicate with locally-hosted applications 306 using Applications Program Interfaces (APIs).

An interaction client 304 is able to interact with other interaction clients 304 and with the interaction server system 308 via the network 312. The data exchanged between interaction clients 304, and between an interaction client 304 and the interaction server system 308, includes functions (e.g., commands to invoke functions) as well as payload data (e.g., text, audio, video or other multimedia data).

The interaction server system 308 provides server-side functionality via the network 312 to the interaction clients 304. While certain functions of the interaction system 300 are described herein as being performed by either an interaction client 304 or by the interaction server system 308, the location of certain functionality either within the interaction client 304 or the interaction server system 308 may be a design choice. For example, it may be technically preferable to initially deploy certain technology and functionality within the interaction server system 308 but to later migrate this technology and functionality to the interaction client 304 where a client device 302 has sufficient processing capacity.

The interaction server system 308 supports various services and operations that are provided to the interaction clients 304. Such operations include transmitting data to, receiving data from, and processing data generated by the interaction clients 304. This data may include message content, client device information, geolocation information, media augmentation and overlays, message content persistence conditions, social network information, and live event information, as examples. Data exchanges within the interaction system 300 are invoked and controlled through functions available via user interfaces (UIs) of the interaction clients 304.

Turning now specifically to the interaction server system 308, an Application Program Interface (API) server 316 is coupled to, and provides a programmatic interface to, interaction servers 314. The interaction servers 314 are communicatively coupled to a database server 318, which facilitates access to a database 320 that stores data associated with interactions processed by the interaction servers 314. Similarly, a web server 322 is coupled to the interaction servers 314, and provides web-based interfaces to the interaction servers 314. To this end, the web server 322 processes incoming network requests over the Hypertext Transfer Protocol (HTTP) and several other related protocols.

The Application Program Interface (API) server 316 receives and transmits interaction data (e.g., commands and message payloads) between the client device 302 and the interaction servers 314. Specifically, the Application Program Interface (API) server 316 provides a set of interfaces (e.g., routines and protocols) that can be called or queried by the interaction client 304 in order to invoke functionality of the interaction servers 314. The Application Program Interface (API) server 316 exposes various functions supported by the interaction servers 314, including account registration, login functionality, the sending of interaction data via the interaction servers 314, from a particular interaction client 304 to another interaction client 304, the communication of media files (e.g., images or video) from an interaction client 304 to the interaction servers 314, the settings of a collection of media data (e.g., a story), the retrieval of a list of friends of a user of a client device 302, the retrieval of messages and content, the addition and deletion of entities (e.g., friends) to an entity graph (e.g., a social graph), the location of friends within a social graph, and opening an application event (e.g., relating to the interaction client 304).

The interaction servers 314 host a number of systems and subsystems, describe below with reference to FIG. 4.

Returning to the interaction client 304, features and functions of an external resource (e.g., an application 306 or applet) are made available to a user via an interface of the interaction client 304. In this context, "external" refers to the fact that the application 306 or applet is external to the interaction client 304. The external resource is often provided by a third party but may also be provided by the creator or provider of the interaction client 304. The interaction client 304 receives a user selection of an option to launch or access features of such an external resource. The external resource may be the application 306 installed on the client device 302 (e.g., a "native app"), or a small-scale version of the application (e.g., an "applet") that is hosted on the client device 302 or remote of the client device 302 (e.g., on third-party servers 310). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the interaction client 304. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 304 determines whether the selected external resource is a web-based external resource or a locally-installed application 306. In some cases, applications 306 that are locally installed on the client device 302 can be launched independently of and separately from the interaction client 304, such as by selecting an icon, corresponding to the application 306, on a home screen of the client device 302. Small-scale versions of such applications can be launched or accessed via the interaction client 304 and, in some examples, no or limited portions of the small-scale application can be accessed outside of the interaction client 304. The small-scale application can be launched by the interaction client 304 receiving, from a third-party server 310 for example, a markup-language document associated with the small-scale application and processing such a document.

In response to determining that the external resource is a locally-installed application 306, the interaction client 304 instructs the client device 302 to launch the external resource by executing locally-stored code corresponding to the external resource. In response to determining that the external resource is a web-based resource, the interaction client 304 communicates with the third-party servers 310 (for example) to obtain a markup-language document corresponding to the selected external resource. The interaction client 304 then processes the obtained markup-language document to present the web-based external resource within a user interface of the interaction client 304.

The interaction client 304 can notify a user of the client device 302, or other users related to such a user (e.g., "friends"), of activity taking place in one or more external resources. For example, the interaction client 304 can provide participants in a conversation (e.g., a chat session) in the interaction client 304 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 304, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 304. The external resource can selectively include different media items in the responses, based on a current context of the external resource.

The interaction client 304 can present a list of the available external resources (e.g., applications 306 or applets) to a user to launch or access a given external resource. This list can be presented in a context-sensitive menu. For example, the icons representing different ones of the application 306 (or applets) can vary based on how the menu is launched by the user (e.g., from a conversation interface or from a non-conversation interface).

System Architecture

Figure 4:
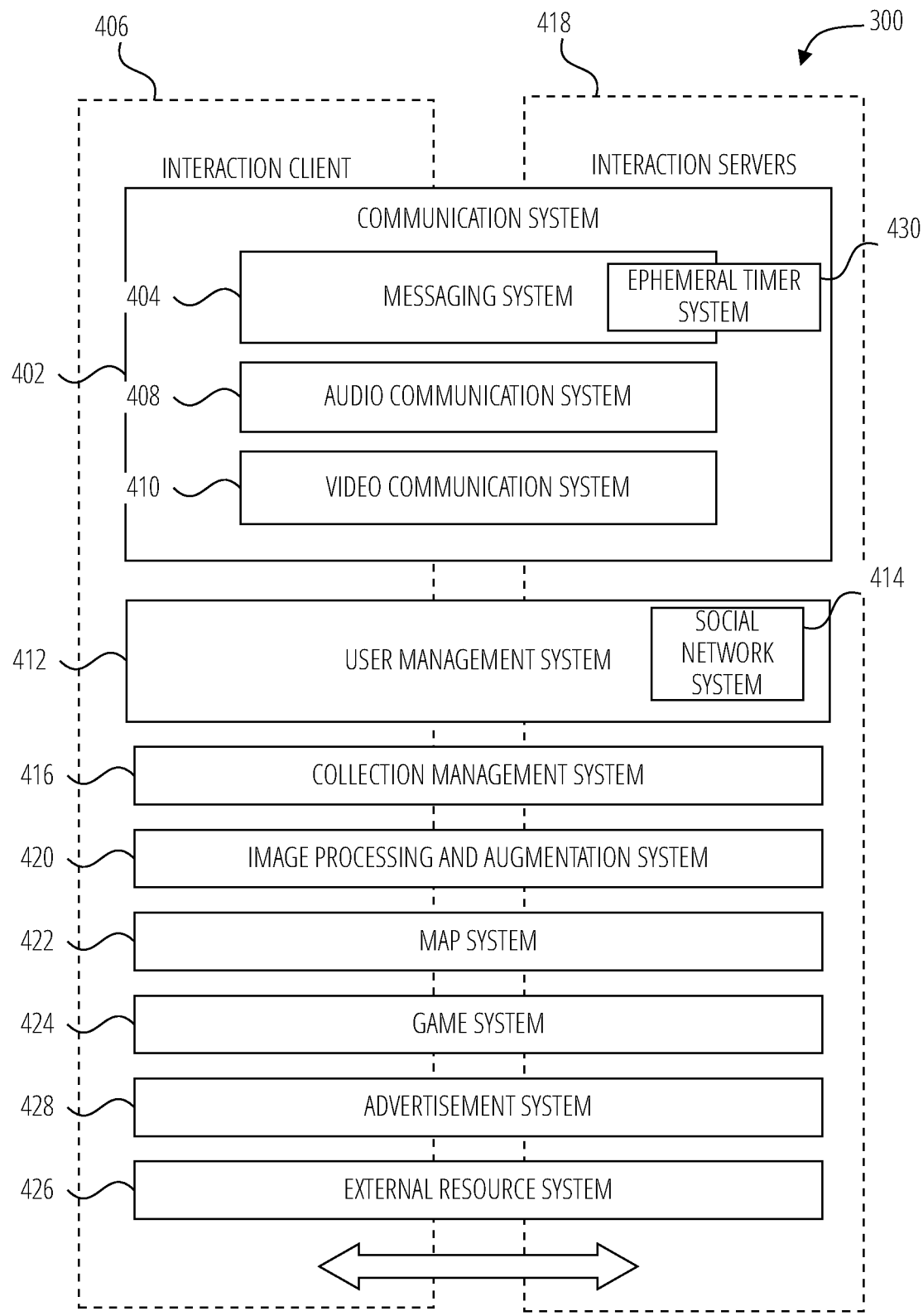
FIG. 4 is a diagrammatic representation of a messaging system, in accordance with some examples, that has both client-side and server-side functionality.

FIG. 4 is a block diagram illustrating further details regarding the interaction system 300, according to some examples. Specifically, the interaction system 300 is shown to comprise the interaction client 406 and the interaction servers 418. The interaction system 300 embodies a number of subsystems, which are supported on the client-side by the interaction client 406 and on the sever-side by the interaction servers 418. Example subsystems are discussed below.

A 302 is responsible for enabling and processing multiple forms of communication and interaction within the interaction system 300, and includes a messaging system 404, an audio communication system 408, and a video communication system 410. The messaging system 404 is responsible for enforcing the temporary or time-limited access to content by the interaction clients 406. The messaging system 404 incorporates a number of timers (e.g., within an ephemeral timer system 430) that, based on duration and display parameters associated with a message, or collection of messages (e.g., a story), selectively enable access (e.g., for presentation and display) to messages and associated content via the interaction client 406. Further details regarding the operation of the ephemeral timer system 430 are provided below. The audio communication system 408 enables and supports audio communications (e.g., real-time audio chat) between multiple interaction clients 406. Similar, the video communication system 410 enables and supports video communications (e.g., real-time video chat) between multiple interaction clients 406.

A user management system 412 is operationally responsible for the management of user data and profiles, and includes a social network system 414 that maintains information regarding relationships between users of the interaction system 300.

A collection management system 416 which is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 416 may also be responsible for publishing an icon that provides notification of the existence of a particular collection to the user interface of the interaction client 406. The collection management system 416 furthermore includes a curation function that allows a collection manager to manage and curate a particular collection of content. For example, the curation interface enables an event organizer to curate a collection of content relating to a specific event (e.g., delete inappropriate content or redundant messages). Additionally, the collection management system 416 employs machine vision (or image recognition technology) and content rules to automatically curate a content collection. In certain examples, compensation may be paid to a user for the inclusion of user-generated content into a collection. In such cases, the collection management system 416 operates to automatically make payments to such users for the use of their content.

An image processing and augmentation system 420 provides various functions that enable a user to augment (e.g., annotate or otherwise modify or edit) media content associated with a message. For example, the image processing and augmentation system 420 provides functions related to the generation and publishing of media overlays for messages processed by the interaction system 300. The image processing and augmentation system 420 operatively supplies a media overlay or augmentation (e.g., an image filter) to the interaction client 406 based on a geolocation of the client device 302. In another example, the image processing and augmentation system 420 operatively supplies a media overlay to the interaction client 406 based on other information, such as social network information of the user of the client device 302. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at client device 302 for communication in a message, or applied to video content, such as a video content stream or feed transmitted from an interaction client 406. As such, the image processing and augmentation system 420 may interact with, and support, the various subsystems of the communication system 402, such as the messaging system 404 and the video communication system 410. A media overlay may include text or image that can be overlaid on top of a photograph taken by the client device 302, or a video stream produced by the client device 302. In another examples, the media overlay may be a location overlay (e.g., Venice beach), a name of a live event, or a name of a merchant overlay (e.g., Beach Coffee House). In further examples, the image processing and augmentation system 420 uses the geolocation of the client device 302 to identify a media overlay that includes the name of a merchant at the geolocation of the client device 302. The media overlay may include other indicia associated with the merchant. The media overlays may be stored in the databases 320 and accessed through the database server 318.

In some examples, the image processing and augmentation system 420 provides a user-based publication platform that enables users to select a geolocation on a map and upload content associated with the selected geolocation. The user may also specify circumstances under which a particular media overlay should be offered to other users. The image processing and augmentation system 420 generates a media overlay that includes the uploaded content and associates the uploaded content with the selected geolocation.

In other examples, the image processing and augmentation system 420 provides a merchant-based publication platform that enables merchants to select a particular media overlay associated with a geolocation via a bidding process. For example, the image processing and augmentation system 420 associates the media overlay of the highest bidding merchant with a corresponding geolocation for a predefined amount of time.

A map system 422 provides various geographic location functions, and supports the presentation of map-based media content and messages by the interaction client 406. For example, the map system 422 enables the display of user icons or avatars (e.g., stored in profile data 516) on a map to indicate a current or past location of "friends" of a user, as well as media content (e.g., collections of messages including photographs and videos) generated by such friends, within the context of a map. For example, a message posted by a user to the interaction system 300 from a specific geographic location may be displayed within the context of a map at that particular location to "friends" of a specific user on a map interface of the interaction client 406. A user can furthermore share his or her location and status information (e.g., using an appropriate status avatar) with other users of the interaction system 300 via the interaction client 406, with this location and status information being similarly displayed within the context of a map interface of the interaction client 406 to selected users.

A game system 424 provides various gaming functions within the context of the interaction client 406. The interaction client 406 provides a game interface providing a list of available games that can be launched by a user within the context of the interaction client 406, and played with other users of the interaction system 300. The interaction system 300 further enables a particular user to invite other users to participate in the play of a specific game, by issuing invitations to such other users from the interaction client 406. The interaction client 406 also supports audio, video and text messaging (e.g., chats) within the context of gameplay, provides a leaderboard for the games, and also supports the provision of in-game rewards (e.g., coins and items).

An external resource system 426 provides an interface for the interaction client 406 to communicate with remote servers (e.g., third-party servers 310) to launch or access external resources, i.e. applications or applets. Each third-party server 310 hosts, for example, a markup language (e.g., HTML5) based application or small-scale version of an application (e.g., game, utility, payment, or ride-sharing application). The interaction client 406 may launches a web-based resource (e.g., application) by accessing the HTML5 file from the third-party servers 310 associated with the web-based resource. In certain examples, applications hosted by third-party servers 310 are programmed in JavaScript leveraging a Software Development Kit (SDK) provided by the interaction servers 418. The SDK includes Application Programming Interfaces (APIs) with functions that can be called or invoked by the web-based application. In certain examples, the interaction servers 418 includes a JavaScript library that provides a given external resource access to certain user data of the interaction client 406. HTML5 is used as an example technology for programming games, but applications and resources programmed based on other technologies can be used.

In order to integrate the functions of the SDK into the web-based resource, the SDK is downloaded by a third-party server 310 from the interaction servers 418 or is otherwise received by the third-party server 310. Once downloaded or received, the SDK is included as part of the application code of a web-based external resource. The code of the web-based resource can then call or invoke certain functions of the SDK to integrate features of the interaction client 406 into the web-based resource.

The SDK stored on the interaction server system 308 effectively provides the bridge between an external resource (e.g., applications 306 or applets and the interaction client 406. This provides the user with a seamless experience of communicating with other users on the interaction client 406, while also preserving the look and feel of the interaction client 406. To bridge communications between an external resource and an interaction client 406, in certain examples, the SDK facilitates communication between third-party servers 310 and the interaction client 406. In certain examples, a WebViewJavaScriptBridge running on a client device 302 establishes two one-way communication channels between an external resource and the interaction client 406. Messages are sent between the external resource and the interaction client 406 via these communication channels asynchronously. Each SDK function invocation is sent as a message and callback. Each SDK function is implemented by constructing a unique callback identifier and sending a message with that callback identifier.

By using the SDK, not all information from the interaction client 406 is shared with third-party servers 310. The SDK limits which information is shared based on the needs of the external resource. In certain examples, each third-party server 310 provides an HTML5 file corresponding to the web-based external resource to interaction servers 418. The interaction servers 418 can add a visual representation (such as a box art or other graphic) of the web-based external resource in the interaction client 406. Once the user selects the visual representation or instructs the interaction client 406 through a GUI of the interaction client 406 to access features of the web-based external resource, the interaction client 406 obtains the HTML5 file and instantiates the resources necessary to access the features of the web-based external resource.

The interaction client 406 presents a graphical user interface (e.g., a landing page or title screen) for an external resource. During, before, or after presenting the landing page or title screen, the interaction client 406 determines whether the launched external resource has been previously authorized to access user data of the interaction client 406. In response to determining that the launched external resource has been previously authorized to access user data of the interaction client 406, the interaction client 406 presents another graphical user interface of the external resource that includes functions and features of the external resource. In response to determining that the launched external resource has not been previously authorized to access user data of the interaction client 406, after a threshold period of time (e.g., 3 seconds) of displaying the landing page or title screen of the external resource, the interaction client 406 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the interaction client 406 adds the external resource to a list of authorized external resources and allows the external resource to access user data from the interaction client 406. In some examples, the external resource is authorized by the interaction client 406 to access the user data in accordance with an OAuth 2 framework.

The interaction client 406 controls the type of user data that is shared with external resources based on the type of external resource being authorized. For example, external resources that include full-scale applications (e.g., an application 306) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 428 operationally enables the purchasing of advertisements by third parties for presentation to end-users via the interaction clients 204, and also handles the delivery and presentation of these advertisements.

Data Architecture

Figure 5:
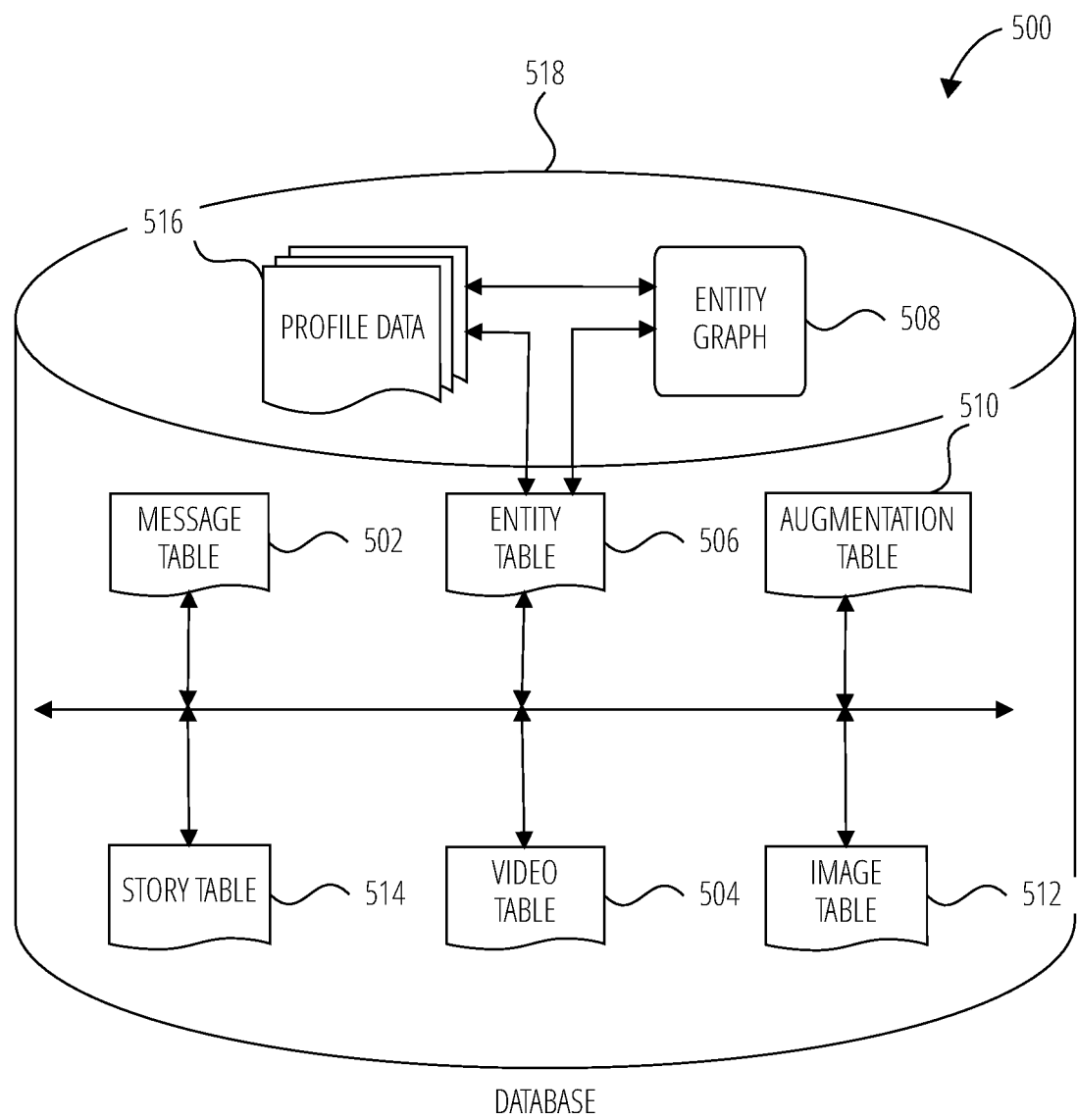
FIG. 5 is a diagrammatic representation of a data structure as maintained in a database, in accordance with some examples.

FIG. 5 is a schematic diagram illustrating data structures 500, which may be stored in the database 518 of the interaction server system 308, according to certain examples. While the content of the database 518 is shown to comprise a number of tables, it will be appreciated that the data could be stored in other types of data structures (e.g., as an object-oriented database).

The database 518 includes message data stored within a message table 502. This message data includes, for any particular one message, at least message sender data, message recipient (or receiver) data, and a payload. Further details regarding information that may be included in a message, and included within the message data stored in the message table 502 is described below with reference to FIG. 5.

An entity table 506 stores entity data, and is linked (e.g., referentially) to an entity graph 508 and profile data 516. Entities for which records are maintained within the entity table 506 may include individuals, corporate entities, organizations, objects, places, events, and so forth. Regardless of entity type, any entity regarding which the interaction server system 308 stores data may be a recognized entity. Each entity is provided with a unique identifier, as well as an entity type identifier (not shown).

The entity graph 508 stores information regarding relationships and associations between entities. Such relationships may be social, professional (e.g., work at a common corporation or organization) interested-based or activity-based, merely for example.

The profile data 516 stores multiple types of profile data about a particular entity. The profile data 516 may be selectively used and presented to other users of the interaction system 300, based on privacy settings specified by a particular entity. Where the entity is an individual, the profile data 516 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 300, and on map interfaces displayed by interaction clients 304 to other users. The collection of avatar representations may include "status avatars," which present a graphical representation of a status or activity that the user may select to communicate at a particular time.

Where the entity is a group, the profile data 516 for the group may similarly include one or more avatar representations associated with the group, in addition to the group name, members, and various settings (e.g., notifications) for the relevant group.

The database 518 also stores augmentation data, such as overlays or filters, in an augmentation table 510. The augmentation data is associated with and applied to videos (for which data is stored in a video table 504) and images (for which data is stored in an image table 512).

Filters, in one example, are overlays that are displayed as overlaid on an image or video during presentation to a recipient user. Filters may be of various types, including user-selected filters from a set of filters presented to a sending user by the interaction client 304, when the sending user is composing a message. Other types of filters include geolocation filters (also known as geo-filters), which may be presented to a sending user based on geographic location. For example, geolocation filters specific to a neighborhood or special location may be presented within a user interface by the interaction client 304, based on geolocation information determined by a Global Positioning System (GPS) unit of the client device 302.

Another type of filter is a data filter, which may be selectively presented to a sending user by the interaction client 304, based on other inputs or information gathered by the client device 302 during the message creation process. Examples of data filters include current temperature at a specific location, a current speed at which a sending user is traveling, battery life for a client device 302, or the current time.

Other augmentation data that may be stored within the image table 512 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the client device 302 and then displayed on a screen of the client device 302 with the modifications. This also includes modifications to stored content, such as video clips in a gallery that may be modified. For example, in a client device 302 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 302 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 302) and perform complex image manipulations locally on the client device 302 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 302.

In some examples, a computer animation model to transform image data can be used by a system where a user may capture an image or video stream of the user (e.g., a selfie) using the client device 302 having a neural network operating as part of an interaction client 304 operating on the client device 302. The transformation system operating within the interaction client 304 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 302 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 514 stores data regarding collections of messages and associated image, video, or audio data, which are compiled into a collection (e.g., a story or a gallery). The creation of a particular collection may be initiated by a particular user (e.g., each user for which a record is maintained in the entity table 506). A user may create a "personal story" in the form of a collection of content that has been created and sent/broadcast by that user. To this end, the user interface of the interaction client 304 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the interaction client 304, to contribute content to a particular live story. The live story may be identified to the user by the interaction client 304, based on his or her location. The end result is a "live story" told from a community perspective.

A further type of content collection is known as a "location story," which enables a user whose client device 302 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 504 stores video data that, in one example, is associated with messages for which records are maintained within the message table 502. Similarly, the image table 512 stores image data associated with messages for which message data is stored in the entity table 506. The entity table 506 may associate various augmentations from the augmentation table 510 with various images and videos stored in the image table 512 and the video table 504.

Methodology/Routines

Figure 6:
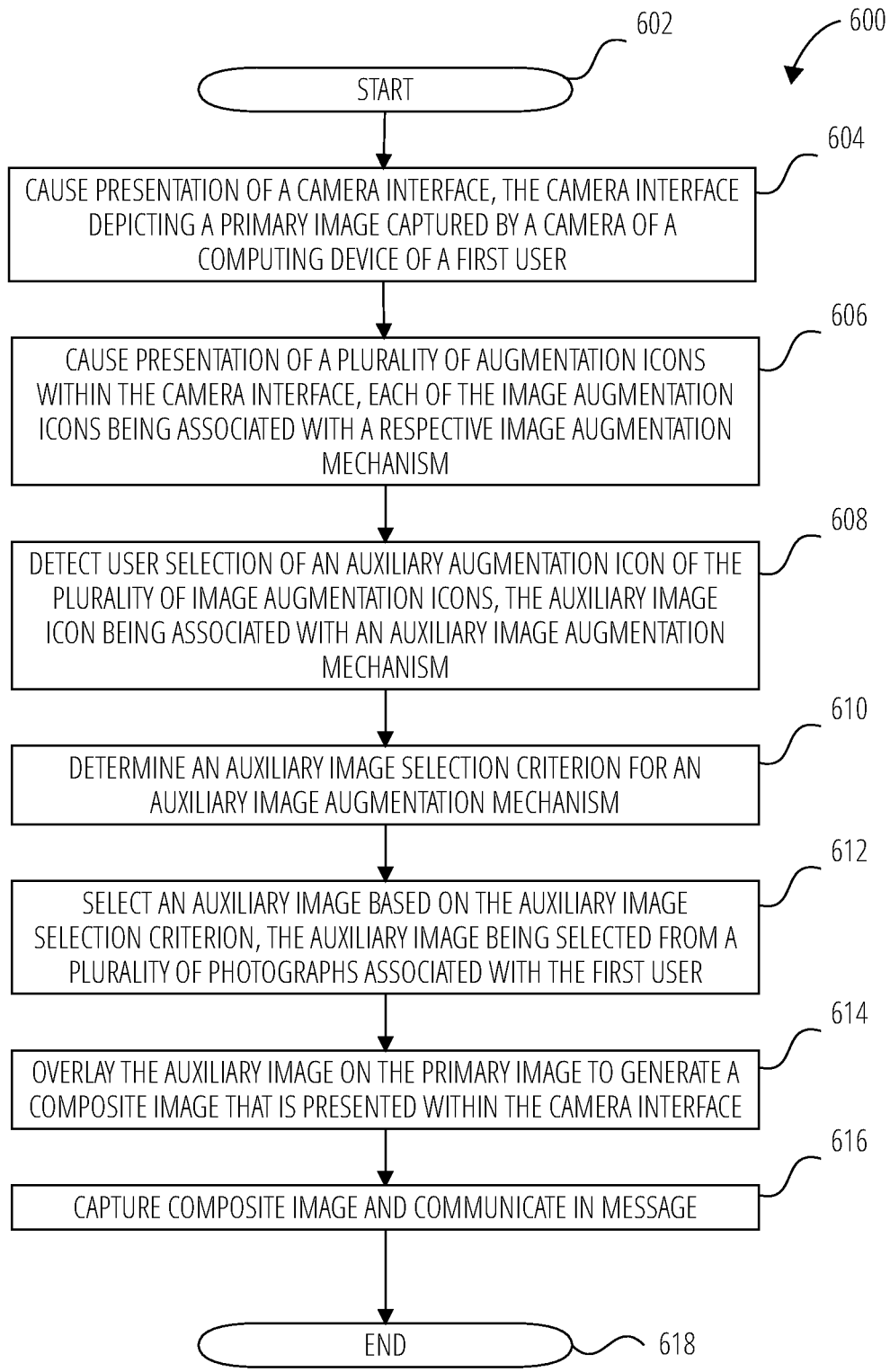
FIG. 6 illustrates a method 600 in accordance with some examples.

FIG. 6 is a flowchart illustrating a method 600, according to some examples, of selecting and presenting auxiliary data within a camera interface 102 presented by an interaction client 304 executing on a client device 302. The method 600 may be implemented on the client device 302 by the interaction client 304 and may be implemented on the interaction server system 308 by the interaction servers 314. The image processing and augmentation system 420 is invoked by various image augmentation mechanisms (e.g., filters), while other subsystems of the interaction system 300 (e.g., the user management system 412 and the collection management system 416) provide additional functionality and services to image augmentation mechanisms.

The method 600 commences at start block 602 and progresses to operation 604, where an interaction client 304 causes the presentation of a camera interface 102, the camera interface 102 depicting a primary image 114 captured by a camera (e.g., a front-facing or a rear-facing camera) of the client device 302 of a first user.

In operation 606, the interaction client 304 causes the presentation of multiple image augmentation graphical elements, in the example form of filter icons 106, within the camera interface 102. Each of the filter icons 106 is associated with a respective image augmentation mechanism in the form of a filter mechanism.

In operation 608, the interaction client 304 detects user selection of an auxiliary augmentation icon (e.g., the "friend memories" filter icon 106) of the image augmentation icons, the auxiliary image icon being associated with an auxiliary image augmentation mechanism (e.g., a "friend memories" filter).

In operation 610, the interaction system 300 determines an auxiliary image selection criterion (or criteria) for an auxiliary image augmentation mechanism. In one example, such as that described with reference to FIG. 1, the determination of the auxiliary image selection criterion may be a multistage process that solicits further input and selections from a viewing user. One such multistage process is described below with reference to FIG. 7. In other examples, the selection criterion may be directly associated with the selected image augmentation mechanism, such as, for example, the augmentation mechanisms described above with reference to screenshot 202 and screenshot 208 of FIG.

2. The selection criterion may be temporal (e.g., criterion related to a specific time of day or to a specific date) or content related (e.g., related to the content of a digital image, such as a specific person, object or location identified in metadata or that image tag of the auxiliary image).

In operation 612, the interaction system 300 selects an auxiliary image 112 based on the auxiliary image selection criterion, the auxiliary image 112 being selected from a collection of digital media (e.g., digital photographs) associated with the viewing user. For example, the viewing user may have taken a number of photographs using the client device 302 and shared these photographs with other users of the interaction system 300 in messages communicated using the communication system 402. The auxiliary image 112 may be selected from this collection of shared digital photographs. In another example, the viewing user may have been tagged in a digital photograph, or have received a digital photograph from another user, and as such digital photographs may also be regarded as included in the collection from which the auxiliary image 112 is selected. Additionally, the collection of media may include videos, digital stickers, digital avatars, and other captured or created visual or audio digital information.

In operation 614, the interaction system 300 overlays the auxiliary image 112 on the primary image 114 to generate a composite image that is presented within the camera interface 102 of the interaction client 304. At operation 616, the composite image may be captured (e.g., by a user selection of the friend icon 110), and communicated as part of a message sent from the interaction client 304 of the viewing user to an interaction client 326 of a receiving user. The method 600 then ends at done block 618.

While the selection and presentation of only a single auxiliary image 112 onto is shown and described above, the method 600 may be deployed to select multiple auxiliary images 112 for presentation with a primary image 114 to create a multi-image collage that is presented within the camera interface 102, and that can be captured and shared by the viewing user with other users. In this case, multiple selection criteria may be used to identify multiple auxiliary images.

Figure 7:
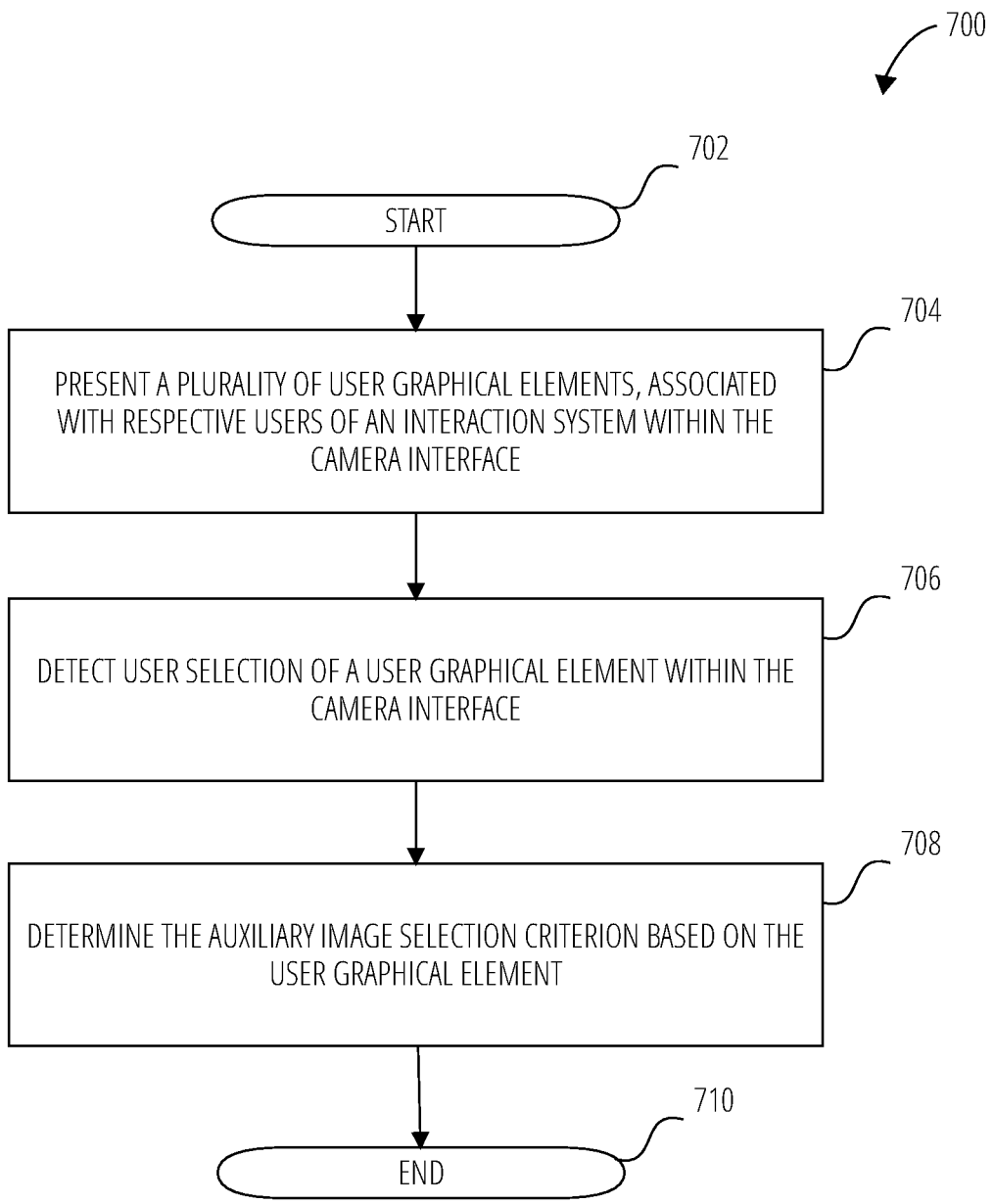
FIG. 7 illustrates a method 700 in accordance with some examples.

FIG. 7 is a flowchart illustrating a method 700, according to some examples, that may be implemented at operation 610 in order to determine an auxiliary image selection criterion to be used by an auxiliary image augmentation mechanism (e.g., a filter) to identify and select one or more auxiliary images 112. The method 700 may be used to generate, for example, the friend carousel 108 shown in FIG. 1 and FIG. 2.

The method 700 commences at start block 702 and then progresses to operation 704 with the presentation, within the camera interface 102, of multiple user graphical elements in the form of friend icons 110 that are presented within the context of a friend carousel 108. Each of these friend icons is associated with a respective user of the interaction system 300, and each of these uses may be identified as being associated with the viewing user (e.g., a friend of the viewing user or someone included in a common group with the viewing user).

At operation 706, user-selection of a friend icon 110 is detected within the context of the camera interface 102. User selection may include tapping on the friend icon on a haptic or touch sensitive screen of the client device 302.

At operation 708, the auxiliary image augmentation mechanism determines the auxiliary image selection criterion (e.g., a filter criterion) based on the selection of a specific friend icon 110. The filter criterion, in this example, may be a user identifier that is used to identify digital content (e.g., digital photographs captured or shared by or with the viewing user) associated with the user identifier. A user identifier may be associated with a particular digital photograph by the interaction system 300 on account of the digital photograph being shared by or with the relevant user (e.g., the relevant user was a sender or recipient of a digital communication that included the particular digital photograph).

The method 700 hen terminates at done block 710

Data Communications Architecture

Figure 8:
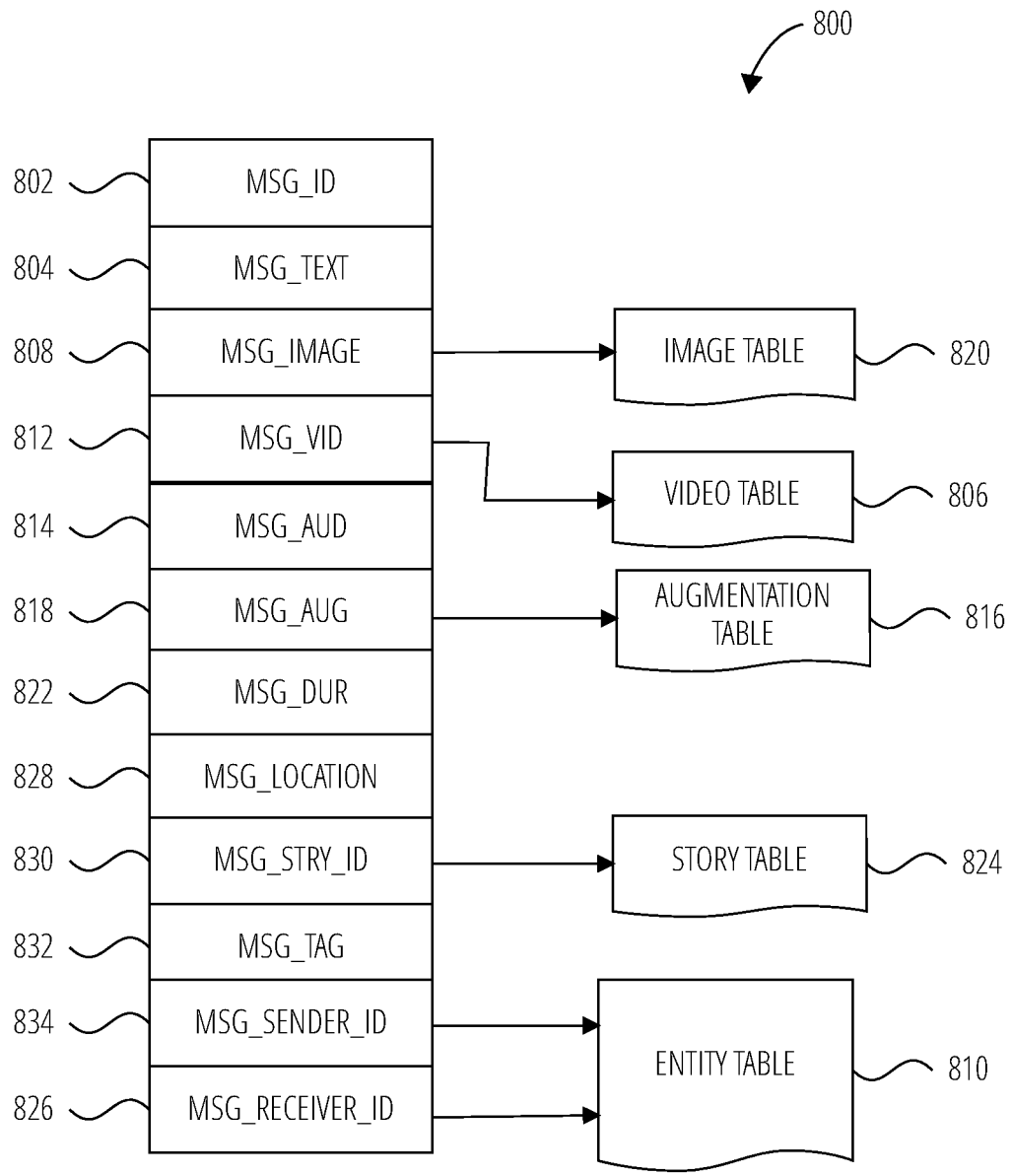
FIG. 8 is a diagrammatic representation of a message, in accordance with some examples.

FIG. 8 is a schematic diagram illustrating a structure of a message 800, according to some examples, generated by an interaction client 304 for communication to a further interaction client 304 via the interaction servers 314. The content of a particular message 800 is used to populate the message table 502 stored within the database 320, accessible by the interaction servers 314. Similarly, the content of a message 800 is stored in memory as "in-transit" or "in-flight" data of the client device 302 or the interaction servers 314. A message 800 is shown to include the following example components:

- message identifier 802: a unique identifier that identifies the message 800.
- message text payload 804: text, to be generated by a user via a user interface of the client device 302, and that is included in the message 800.
- message image payload 808: image data, captured by a camera component of a client device 302 or retrieved from a memory component of a client device 302, and that is included in the message 800. Image data for a sent or received message 800 may be stored in the image table 820.
- message video payload 812: video data, captured by a camera component or retrieved from a memory component of the client device 302, and that is included in the message 800. Video data for a sent or received message 800 may be stored in the video table 806.
- message audio payload 814: audio data, captured by a microphone or retrieved from a memory component of the client device 302, and that is included in the message 800.
- message augmentation data 818: augmentation data (e.g., filters, stickers, or other annotations or enhancements) that represents augmentations to be applied to message image payload 808, message video payload 812, or message audio payload 814 of the message 800. Augmentation data for a sent or received message 800 may be stored in the augmentation table 816.
- message duration parameter 822: parameter value indicating, in seconds, the amount of time for which content of the message (e.g., the message image payload 808, message video payload 812, message audio payload 814) is to be presented or made accessible to a user via the interaction client 304.
- message geolocation parameter 828: geolocation data (e.g., latitudinal and longitudinal coordinates) associated with the content payload of the message. Multiple message geolocation parameter 828 values may be included in the payload, each of these parameter values being associated with respect to content items included in the content (e.g., a specific image into within the message image payload 808, or a specific video in the message video payload 812).
- message story identifier 830: identifier values identifying one or more content collections (e.g., "stories" identified in the story table 824) with which a particular content item in the message image payload 808 of the message 800 is associated. For example, multiple images within the message image payload 808 may each be associated with multiple content collections using identifier values.

message tag 832: each message 800 may be tagged with multiple tags, each of which is indicative of the subject matter of content included in the message payload. For example, where a particular image included in the message image payload 808 depicts an animal (e.g., a lion), a tag value may be included within the message tag 832 that is indicative of the relevant animal. Tag values may be generated manually, based on user input, or may be automatically generated using, for example, image recognition.

message sender identifier 834: an identifier (e.g., a messaging system identifier, email address, or device identifier) indicative of a user of the Client device 302 on which the message 800 was generated and from which the message 800 was sent.

message receiver identifier 826: an identifier (e.g., a messaging system identifier, email address, or device identifier) indicative of a user of the client device 302 to which the message 800 is addressed.

The contents (e.g., values) of the various components of message 800 may be pointers to locations in tables within which content data values are stored. For example, an image value in the message image payload 808 may be a pointer to (or address of) a location within an image table 820. Similarly, values within the message video payload 812 may point to data stored within a video table 806, values stored within the message augmentations 412 may point to data stored in an augmentation table 816, values stored within the message story identifier 830 may point to data stored in a story table 824, and values stored within the message sender identifier 834 and the message receiver identifier 826 may point to user records stored within an entity table 810.

Time-Based Access Limitation Architecture

Figure 9:
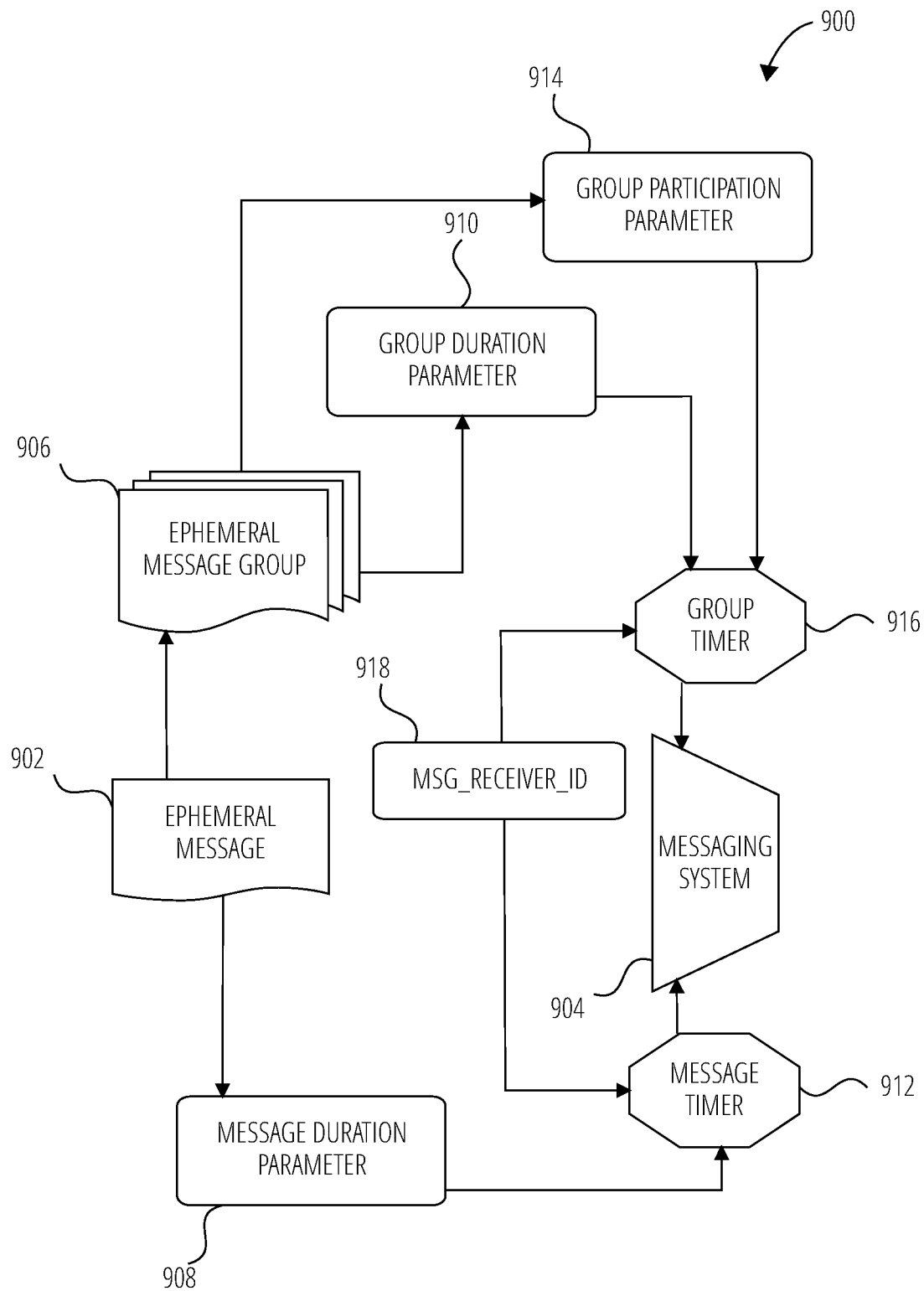
FIG. 9 is a flowchart for an access-limiting process, in accordance with some examples.

FIG. 9 is a schematic diagram illustrating an access-limiting process 900, in terms of which access to content (e.g., an ephemeral message 902, and associated multimedia payload of data) or a content collection (e.g., an ephemeral message group 906) may be time-limited (e.g., made ephemeral).

An ephemeral message 902 is shown to be associated with a message duration parameter 908, the value of which determines an amount of time that the ephemeral message 902 will be displayed to a receiving user of the ephemeral message 902 by the interaction client 304. In one example, an ephemeral message 902 is viewable by a receiving user for up to a maximum of 10 seconds, depending on the amount of time that the sending user specifies using the message duration parameter 908.

The message duration parameter 908 and the message receiver identifier 918 are shown to be inputs to a message timer 912, which is responsible for determining the amount of time that the ephemeral message 902 is shown to a particular receiving user identified by the message receiver identifier 918. In particular, the ephemeral message 902 will only be shown to the relevant receiving user for a time period determined by the value of the message duration parameter 908. The message timer 912 is shown to provide output to a more generalized messaging system 904, which is responsible for the overall timing of display of content (e.g., an ephemeral message 902) to a receiving user.

The ephemeral message 902 is shown in FIG. 9 to be included within an ephemeral message group 906 (e.g., a collection of messages in a personal story, or an event story). The ephemeral message group 906 has an associated group duration parameter 910, a value of which determines a time duration for which the ephemeral message group 906 is presented and accessible to users of the interaction system 300. The group duration parameter 910, for example, may be the duration of a music concert, where the ephemeral message group 906 is a collection of content pertaining to that concert. Alternatively, a user (either the owning user or a curator user) may specify the value for the group duration parameter 910 when performing the setup and creation of the ephemeral message group 906.

Additionally, each ephemeral message 902 within the ephemeral message group 906 has an associated group participation parameter 914, a value of which determines the duration of time for which the ephemeral message 902 will be accessible within the context of the ephemeral message group 906. Accordingly, a particular ephemeral message group 906 may "expire" and become inaccessible within the context of the ephemeral message group 906, prior to the ephemeral message group 906 itself expiring in terms of the group duration parameter 910. The group duration parameter 910, group participation parameter 914, and message receiver identifier 918 each provide input to a group timer 916, which operationally determines, firstly, whether a particular ephemeral message 902 of the ephemeral message group 906 will be displayed to a particular receiving user and, if so, for how long. Note that the ephemeral message group 906 is also aware of the identity of the particular receiving user as a result of the message receiver identifier 918.

Accordingly, the group timer 916 operationally controls the overall lifespan of an associated ephemeral message group 906, as well as an individual ephemeral message 902 included in the ephemeral message group 906. In one example, each and every ephemeral message 902 within the ephemeral message group 906 remains viewable and accessible for a time period specified by the group duration parameter 910. In a further example, a certain ephemeral message 902 may expire, within the context of ephemeral message group 906, based on a group participation parameter 914. Note that a message duration parameter 908 may still determine the duration of time for which a particular ephemeral message 902 is displayed to a receiving user, even within the context of the ephemeral message group 906. Accordingly, the message duration parameter 908 determines the duration of time that a particular ephemeral message 902 is displayed to a receiving user, regardless of whether the receiving user is viewing that ephemeral message 902 inside or outside the context of an ephemeral message group 906.

The messaging system 904 may furthermore operationally remove a particular ephemeral message 902 from the ephemeral message group 906 based on a determination that it has exceeded an associated group participation parameter 914. For example, when a sending user has established a group participation parameter 914 of 24 hours from posting, the messaging system 904 will remove the relevant ephemeral message 902 from the ephemeral message group 906 after the specified 24 hours. The messaging system 904 also operates to remove an ephemeral message group 906 when either the group participation parameter 914 for each and every ephemeral message 902 within the ephemeral message group 906 has expired, or when the ephemeral message group 906 itself has expired in terms of the group duration parameter 910.

In certain use cases, a creator of a particular ephemeral message group 906 may specify an indefinite group duration parameter 910. In this case, the expiration of the group participation parameter 914 for the last remaining ephemeral message 902 within the ephemeral message group 906 will determine when the ephemeral message group 906 itself expires. In this case, a new ephemeral message 902, added to the ephemeral message group 906, with a new group participation parameter 914, effectively extends the life of an ephemeral message group 906 to equal the value of the group participation parameter 914.

Responsive to the messaging system 904 determining that an ephemeral message group 906 has expired (e.g., is no longer accessible), the messaging system 904 communicates with the interaction system 300 (and, for example, specifically the interaction client 304) to cause an indicium (e.g., an icon) associated with the relevant ephemeral message group 906 to no longer be displayed within a user interface of the interaction client 304. Similarly, when the messaging system 904 determines that the message duration parameter 908 for a particular ephemeral message 902 has expired, the messaging system 904 causes the interaction client 304 to no longer display an indicium (e.g., an icon or textual identification) associated with the ephemeral message 902.

Machine Architecture

Figure 10:
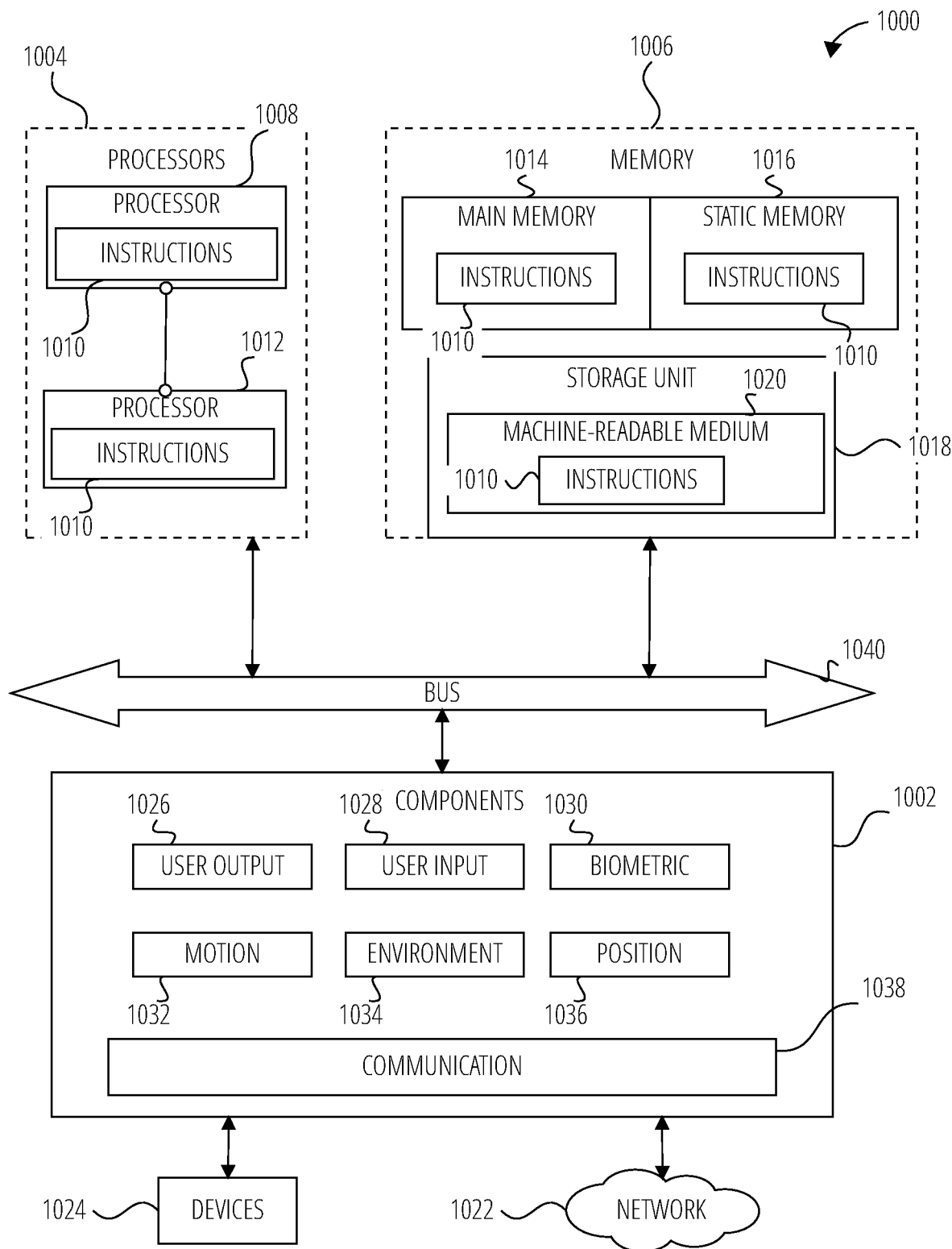
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 202 (deleted) or any one of a number of server devices forming part of the interaction server system 208 (deleted). In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 302 may have a camera system comprising, for example, front cameras on a front surface of the client device 302 and rear cameras on a rear surface of the client device 302. The front cameras may, for example, be used to capture still images and video of a user of the client device 302 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 302 may also include a 360° camera for capturing 360° photographs and videos.

Further, the camera system of the client device 302 may include dual rear cameras (e.g., a primary camera as well as a depth-sensing camera), or even triple, quad or penta rear camera configurations on the front and rear sides of the client device 302. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
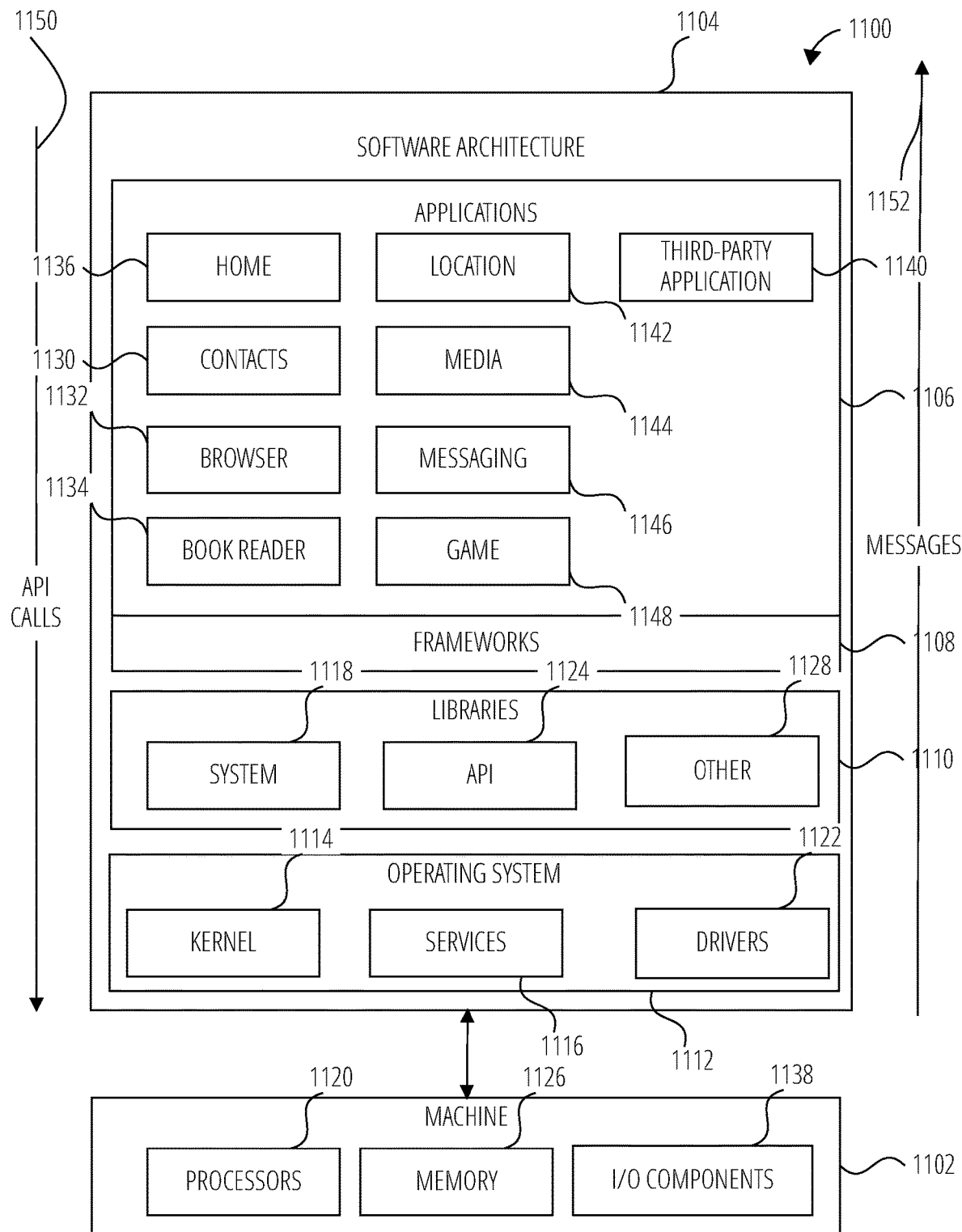
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

CONCLUSION

In one example, the method includes causing presentation of a camera interface, the camera interface to display a primary image captured by a camera of a computing device of a first user, causing presentation of a plurality of augmentation icons within the camera interface, each of the image augmentation icons being associated with a respective image augmentation mechanism, detecting user selection of an auxiliary augmentation icon of the plurality of image augmentation icons, the auxiliary image icon being associated with an auxiliary image augmentation mechanism, determining an auxiliary image selection criterion for an auxiliary image augmentation mechanism, selecting an auxiliary image based on the auxiliary image selection criterion, the auxiliary image being selected from a plurality of photographs associated with the first user, and overlaying the auxiliary image on the primary image to generate a composite image that is presented within the camera interface.

The method may also include where the determining of the auxiliary image selection criterion for the auxiliary image augmentation mechanism includes presenting a plurality of user graphical elements, associated with respective users of an interaction system within the camera interface, detecting user selection of a user graphical element within the camera interface, and determining the auxiliary image selection criterion based on the user graphical element.

The method may also include where the auxiliary image selection criterion includes a temporal criterion, and the auxiliary image is identified based on the temporal criterion.

The method may also include where the auxiliary image selection criterion includes an image content criterion, and the selecting of the auxiliary image is based on detecting content corresponding to the image content criterion within the auxiliary image.

The method may also include where the auxiliary image selection criterion includes an image tag criterion, and the selecting of the auxiliary image is based on detecting an image tag for the user image corresponding to the image tag criterion.

The method may also include including capturing the composite image is presented within the camera interface, and communicating the composite image as part of a message from the computing device, responsive to user messaging input.

The method may also include where the plurality of photographs from which the auxiliary images selected includes a collection of images generated by the first user. Other technical features may be readily apparent to one skilled in the art from the following figures, descriptions, and claims.

The method may also include where the user graphical element is a user avatar associated with the first user, the auxiliary image selection criterion is an identifier for the first user, and the selecting of the auxiliary image includes selecting the auxiliary image using the identifier of the first user.

The method may also include where the auxiliary image depicts the first user.

The method may also include where the temporal criterion includes a time of day.

The method may also include where the temporal criterion includes a specific date.

Other technical features may be readily apparent to one skilled in the art from the following figures, descriptions, and claims Glossary "Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   causing presentation of a camera interface, the camera interface to display a first image captured by a camera of a computing device of a first user;
   causing presentation of a plurality of image augmentation icons within the camera interface, each of the plurality of image augmentation icons being associated with a respective image augmentation mechanism;
   detecting user selection of an auxiliary image augmentation icon of the plurality of image augmentation icons, the auxiliary image augmentation icon being associated with an auxiliary image augmentation mechanism;
   determining an auxiliary image selection criterion for the auxiliary image augmentation mechanism;
   selecting a set of auxiliary images based on the auxiliary image selection criterion, the set of auxiliary images being selected from a plurality of photographs associated with the first user, and
   overlaying the set of auxiliary images on the first image to generate a composite image that is presented within the camera interface, the set of auxiliary images being user-selectable to scroll through each auxiliary image in the set of auxiliary images.

2. The method of claim 1, wherein the determining of the auxiliary image selection criterion for the auxiliary image augmentation mechanism comprises:
   presenting a plurality of user graphical elements, associated with respective users of an interaction system within the camera interface;
   detecting user selection of a user graphical element within the camera interface; and
   determining the auxiliary image selection criterion based on the user graphical element.

3. The method of claim 2, wherein the user graphical element is a user avatar associated with the first user, the auxiliary image selection criterion is an identifier for the first user, and the selecting of the set of auxiliary images comprises selecting the set of auxiliary images using the identifier of the first user.

4. The method of claim 3, wherein the set of auxiliary images depicts the first user.

5. The method of claim 1, wherein the auxiliary image selection criterion comprises a temporal criterion, and the set of auxiliary images is identified based on the temporal criterion.

6. The method of claim 5, wherein the temporal criterion comprises a time of day.

7. The method of claim 5, wherein the temporal criterion comprises a specific date.

8. The method of claim 1, wherein the auxiliary image selection criterion comprises an image content criterion, and the selecting of the set of auxiliary images is based on detecting content corresponding to the image content criterion within the set of auxiliary images.

9. The method of claim 1, wherein the auxiliary image selection criterion comprises an image tag criterion, and the selecting of the set of auxiliary images is based on detecting an image tag for the user image corresponding to the image tag criterion.

10. The method of claim 1, including capturing the composite image is presented within the camera interface, and communicating the composite image as part of a message from the computing device, responsive to user messaging input.

11. The method of claim 1, wherein the plurality of photographs from which the set of auxiliary images is selected comprises a collection of images generated by the first user.

12. A computing apparatus comprising:
a processor; and
a memory storing instructions that, when executed by the processor, configure the apparatus to:
cause presentation of a camera interface, the camera interface to display a first image captured by a camera of a computing device of a first user;
cause presentation of a plurality of image augmentation icons within the camera interface, each of the plurality of image augmentation icons being associated with a respective image augmentation mechanism;
detect user selection of an auxiliary image augmentation icon of the plurality of image augmentation icons, the auxiliary image augmentation icon being associated with an auxiliary image augmentation mechanism;
determine an auxiliary image selection criterion for the auxiliary image augmentation mechanism;
select a set of auxiliary images based on the auxiliary image selection criterion, the set of auxiliary images being selected from a plurality of photographs associated with the first user, and
overlay the set of auxiliary images on the first image to generate a composite image that is presented within the camera interface, the set of auxiliary images being user-selectable to scroll through each auxiliary image in the set of auxiliary images.

13. The computing apparatus of claim 12, wherein the determining of the auxiliary image selection criterion for the auxiliary image augmentation mechanism comprises:
present a plurality of user graphical elements, associated with respective users of an interaction system within the camera interface;
detect user selection of a user graphical element within the camera interface; and
determine the auxiliary image selection criterion based on the user graphical element.

14. The computing apparatus of claim 13, wherein the user graphical element is a user avatar associated with the first user, the auxiliary image selection criterion is an identifier for the first user, and the selecting of the set of auxiliary images comprises selecting the set of auxiliary images using the identifier of the first user.

15. The computing apparatus of claim 14, wherein the set of auxiliary images depicts the first user.

16. The computing apparatus of claim 12, wherein the auxiliary image selection criterion comprises a temporal criterion, and the set of auxiliary images is identified based on the temporal criterion.

17. The computing apparatus of claim 16, wherein the temporal criterion comprises a time of day.

18. The computing apparatus of claim 16, wherein the temporal criterion comprises a specific date.

19. The computing apparatus of claim 12, wherein the auxiliary image selection criterion comprises an image content criterion, and the selecting of the set of auxiliary images is based on detecting content corresponding to the image content criterion within the set of auxiliary images.

20. The computing apparatus of claim 12, wherein the auxiliary image selection criterion comprises an image tag criterion, and the selecting of the set of auxiliary images is based on detecting an image tag for the user image corresponding to the image tag criterion.

21. The computing apparatus of claim 12, wherein the composite image is presented within the camera interface, and the composite image is communicated as part of a message from the computing device, responsive to user messaging input.

22. The computing apparatus of claim 12, wherein the plurality of photographs from which the set of auxiliary images is selected comprises a collection of images generated by the first user.

23. A non-transitory computer-readable storage medium, the computer-readable storage medium including instructions that when executed by a computer, cause the computer to:
cause presentation of a camera interface, the camera interface to display a first image captured by a camera of a computing device of a first user;
cause presentation of a plurality of image augmentation icons within the camera interface, each of the plurality of image augmentation icons being associated with a respective image augmentation mechanism;
detect user selection of an auxiliary image augmentation icon of the plurality of image augmentation icons, the auxiliary image augmentation icon being associated with an auxiliary image augmentation mechanism;
determine an auxiliary image selection criterion for the auxiliary image augmentation mechanism;
select a set of auxiliary images based on the auxiliary image selection criterion, the set of auxiliary images being selected from a plurality of photographs associated with the first user; and
overlay the set of auxiliary images on the first image to generate a composite image that is presented within the camera interface, the set of auxiliary images being user-selectable to scroll through each auxiliary image in the set of auxiliary images.

24. The computer-readable storage medium of claim 23, wherein the determining of the auxiliary image selection criterion for the auxiliary image augmentation mechanism comprises:
present a plurality of user graphical elements, associated with respective users of an interaction system within the camera interface;
detect user selection of a user graphical element within the camera interface; and
determine the auxiliary image selection criterion based on the user graphical element.

25. The computer-readable storage medium of claim 24, wherein the user graphical element is a user avatar associated with the first user, the auxiliary image selection criterion is an identifier for the first user, and the selecting of the set of auxiliary images comprises selecting the set of auxiliary images using the identifier of the first user.

26. The computer-readable storage medium of claim 25, wherein the set of auxiliary images depicts the first user.

27. The computer-readable storage medium of claim 23, wherein the auxiliary image selection criterion comprises a temporal criterion, and the set of auxiliary images is identified based on the temporal criterion.

28. The computer-readable storage medium of claim 27, wherein the temporal criterion comprises a time of day.

29. The computer-readable storage medium of claim 27, wherein the temporal criterion comprises a specific date.

30. The computer-readable storage medium of claim 23, wherein the auxiliary image selection criterion comprises an image content criterion, and the selecting of the set of auxiliary images is based on detecting content corresponding to the image content criterion within the set of auxiliary images.

31. The computer-readable storage medium of claim 23, wherein the auxiliary image selection criterion comprises an image tag criterion, and the selecting of the set of auxiliary images is based on detecting an image tag for the user image corresponding to the image tag criterion.

32. The computer-readable storage medium of claim 23, including capturing the composite image is presented within the camera interface, and communicating the composite image as part of a message from the computing device, responsive to user messaging input.

33. The computer-readable storage medium of claim 23, wherein the plurality of photographs from which the set of auxiliary images is selected comprises a collection of images generated by the first user.

* * * * *